US012592860B2

(12) United States Patent
Jarah et al.

(10) Patent No.: US 12,592,860 B2
(45) Date of Patent: Mar. 31, 2026

(54) NETWORK PACKET CAPTURE ANALYSIS USING MACHINE LEARNING MODEL

(71) Applicant: B.yond, Inc., Redmond, WA (US)

(72) Inventors: Kenan Jarah, Belgrade (RS); Jamal Atieh, Hazmieh (LB); Joseph Majdalani, Broumana (LB); Mohammad Zakaria, Barsa (LB); Pierre Moufarrege, Montreal (CA)

(73) Assignee: B.yond, Inc., Redmond, WA (US)

( * ) Notice: Subject to any disclaimer, the term of this patent is extended or adjusted under 35 U.S.C. 154(b) by 361 days.

(21) Appl. No.: 18/353,920

(22) Filed: Jul. 18, 2023

(65) Prior Publication Data

US 2025/0030611 A1      Jan. 23, 2025

(51) Int. Cl.
| | |
|---|---|
| *H04L 41/16* | (2022.01) |
| *G06N 5/04* | (2023.01) |
| *H04L 41/06* | (2022.01) |

(52) U.S. Cl.
CPC ............... *H04L 41/16* (2013.01); *G06N 5/04* (2013.01); *H04L 41/06* (2013.01)

(58) Field of Classification Search
CPC ....... H04L 41/16; H04L 41/06; H04L 41/145; H04L 41/147; G06N 5/04; G06N 20/00
See application file for complete search history.

(56) References Cited

U.S. PATENT DOCUMENTS

| | | | | |
|---|---|---|---|---|
| 8,577,817 | B1* | 11/2013 | Keralapura | ............ G06N 20/00 370/235 |
| 2018/0034738 | A1* | 2/2018 | Zsohar | ................ H04L 47/2441 |
| 2019/0260683 | A1* | 8/2019 | Hughes | ................... H04L 47/00 |
| 2019/0294995 | A1* | 9/2019 | Pastor Perales | ....... G06N 20/00 |
| 2021/0367871 | A1 | 11/2021 | Musa | |
| 2022/0272005 | A1* | 8/2022 | Pandian | .............. H04L 61/2535 |
| 2022/0294561 | A1* | 9/2022 | Gopalan | ............. G06F 9/30087 |
| 2024/0214844 | A1* | 6/2024 | Sáfár | ....................... H04L 43/08 |

OTHER PUBLICATIONS

International Search Report of PCT/US24/30647 mailed on Sep. 20, 2024.

* cited by examiner

*Primary Examiner* — Abdullahi E Salad
(74) *Attorney, Agent, or Firm* — WTA IP Law P.C.

(57) ABSTRACT

Embodiments relate to analyzing network packets in a telecommunication networks using machine learning models. The network packets are correlated and then labeled to indicate successes or failures in a subtask of communication flow. Features are extracted based on the labels and correlated network packets. The extracted features are applied to a machine learning model to predict or infer success or failure of the entire communication flow. The result from the machine learning model may again be applied to subsequent machine learning models to predict root cause of a failure or to predict or infer the type of success. In this way, more accurate diagnosis of network issues in the telecommunication networks may be made in a more expedient manner.

20 Claims, 6 Drawing Sheets

Telecommunication
System
100

Computing
Device
102

Computing
Device
102

Network
108

Network Traffic
Analysis Device
110

Computing
Device
102

Receive Network Packets
810

Preprocess Network Packets and Tag Labels
814

Extract Features from Correlated Network Packets and Labels
818

Apply Extracted Features to Trained Machine Learning Model Predict Success or Failure of Communication Flow
822

Generate Inference Output
826

NETWORK PACKET CAPTURE ANALYSIS USING MACHINE LEARNING MODEL

BACKGROUND

This disclosure relates generally to analyzing packet capture (PCAP) files in a network, and more specifically to predicting or inferring success or failure of a communication flow in the network using machine learning models.

A packet capture (PCAP) file is a digital data file that serves as a record of network traffic. The PCAP file is created by network sniffing tools or packet capture software, which capture and store individual network packets as they traverse a network interface or specific network segment. The PCAP files are widely used in various network-related activities such as network analysis, troubleshooting, and network security. They store the complete contents of each captured packet, including the packet header information, payload data, and any other relevant metadata. The PCAP files are formulated into a file format known as the libpcap format, which ensures compatibility and interoperability among different network analysis tools such as Wireshark, tcpdump, or Snort.

Conventionally, human operators would manually analyze PCAPs using packet decoder applications like Wireshark to search for specific packets related to a subscriber and then try to connect them with other packets associated with the same communication flow. For example, when examining a Voice over 5G (VoNR) call for particular subscribers, the engineer would first locate the relevant packet and then proceed to link all the messages related to that voice call across various protocols like SIP, HTTP2, NGAP, PFCP, and more. The objective is to pinpoint the location of any failures. When multiple failures occur in different protocol interfaces, the human operation would also identify the root cause of the failures, determine which one led to the others, and identify the network elements involved in the root cause. Performing these tasks manually is time-consuming and accompanies a significant risk of human errors. Additionally, without proper visualization, it can be difficult to gain a comprehensive understanding of the entire communication flow.

SUMMARY

Embodiments relate to analyzing network packets by extracting features from network packets and applying the extracted features to a machine learning model. The network packets are captured from a location in a network. The received network packets are then preprocessed. The preprocessing may include extracting a subset of the network packets, correlating network packets in the subset of the network packets, and tagging the correlated network packets with labels that identify success or failure in a subtask of a communication flow associated with the correlated network packets. First features are extracted from the correlated network packets and the labels. The first features are applied to a first machine learning model to predict or infer a success or a failure of the communication flow associated with the correlated network packets. An inference output is generated based on the prediction or the inference of the first machine learning model.

In one or more embodiments, second features are generated from the first features. When the failure of the communication flow is inferred or predicted by the first machine learning model, the second features are applied to a second machine learning model to predict or infer a cause of the failure.

In one or more embodiments, third features are generated from the first features. When the success of the communication flow is inferred or predicted by the first machine learning model, the third features are applied to a third machine learning model to predict or infer a type of success of the communication flow.

In one or more embodiments, the second features are a subset of the first features, and the third features are another subset of the first features.

In one or more embodiments, the first machine learning model generates a first score and the second machine learning model generates a second score. The first score and the second score associated with different thresholds for classifying the prediction or inference.

In one or more embodiments, the correlation of the network packets includes correlating first network packets associated with the same procedure within the same protocol, and correlating second network packets related to the same service across a plurality of different protocols.

In one or more embodiments, the first machine model is trained using synthetic training data created by a simulator that simulates operations on the network.

In one or more embodiments, the first machine learning model outputs a score indicating one of: the success of the communication flow, the failure of the communication flow, and unknown status as to whether the communication flow has succeeded or failed.

Embodiments also relate to training machine learning models for performing network packet analysis. A subset of network packets is extracted from network packets received from a network. The network packets in the subset of the network packets are correlated. The correlated network packets are tagged with first labels that identify successes or failures in subtasks of communication flows associated with the correlated network packets. The correlated network packets are tagged with second labels that identify successes or failures of the communication flows associated with the correlated network packets. First features are extracted from at least the first labels and the second labels. A first machine learning model is trained using the extracted first features to predict or infer successes or failures of subsequent communication flows.

In one or more embodiments, second features are generated from the first features. A second machine learning model is trained using the second features to predict or infer causes of the failure of the communication flows.

In one or more embodiments, third features are generated from the first features. A third machine learning model is trained using the third features to predict types of successes of the communication flows.

In one or more embodiments, additional features are synthesized by simulating operations on the network. The first machine learning model is further trained using the additional features.

Figure 1:
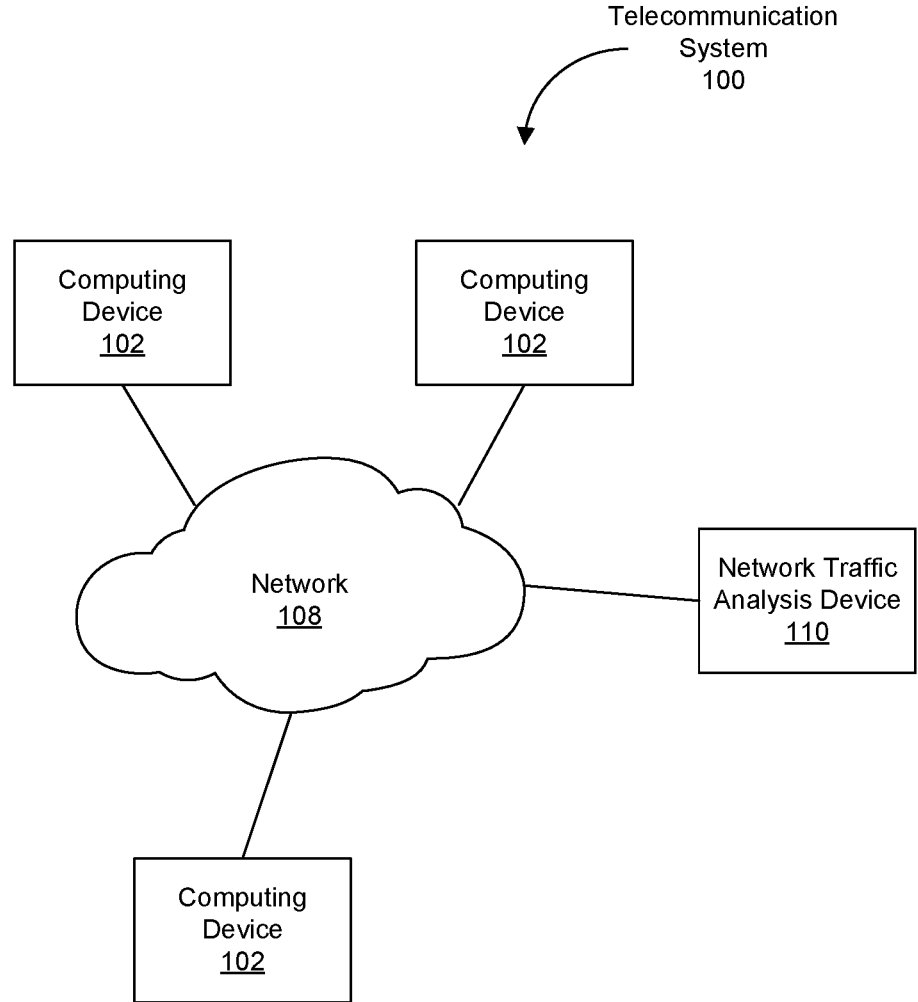
FIG. 1 is a diagram of a telecommunication system for providing information services, according to one embodiment.

The figures depict embodiments of the present disclosure for purposes of illustration only.

DETAILED DESCRIPTION

Embodiments are described herein with reference to the accompanying drawings. Principles disclosed herein may, however, be embodied in many different forms and should not be construed as being limited to the embodiments set forth herein. In the description, details of well-known features and techniques may be omitted to avoid unnecessarily obscuring the features of the embodiments. In the drawings, reference numerals in the drawings denote elements.

Embodiments relate to analyzing network packets in telecommunication networks using machine learning models. The network packets are correlated and labeled to indicate successes or failures in subtasks of communication flow. Features are extracted from the correlated packets and labels. The extracted features are applied to a machine learning model at a lower hierarchy to predict the success or failure of the entire communication flow. The extracted features may be processed (e.g., filtered) and applied to other machine learning models at a higher hierarchy to predict or infer the root cause of a failure or to predict or infer the type of success. In this way, more accurate diagnosis of network issues in the telecommunication networks may be made in a more expedient manner.

A communication flow described herein refers to a sequence of exchange of network packets between two or more entities in a telecommunication network. The communication flow may be used to provide services using the telecommunication network. For example, in a Voice over IP (VoIP) call, the communication flow would include protocols like Session Initiation Protocol (SIP) for call setup, Real-time Transport Protocol (RTP) for audio streaming, and various signaling and control protocols for managing the call session.

Overview of Example System

Figure (FIG.) 1 is a diagram of a telecommunication system 100 for providing information services, according to one embodiment. The system 100 includes computing devices 102 and a network traffic analysis device 110. The computing devices 102 and the network traffic analysis device 110 are connected to each other via a network 108. In other embodiments, different and/or additional components may be included in the system 100.

Computing devices 102 are hardware, software or a combination thereof for performing computing operations that involve communication over network 108. For this purpose, a computing device may include, among other components, a processor, memory, and a network interface. The computing device may be embodied as a server, a desktop computer, a laptop computer, a cellular phone, a smartphone, a game console, a set-top box, a personal digital assistant (PDA), or IoT devices, among other things. Computing devices 102 communicate over network data or information formulated into packets.

Network traffic analysis device 110 is hardware, software or a combination thereof for monitoring and analyzing network traffic in a network. For this purpose, network traffic analysis device 110 captures network packets in network 108 and analyzes various aspects of the traffic such as source and destination of the network packets, protocols used, packet sizes, Packets Messages type, attributes and handshaking pattern, end to end services call flow, and timing information. The details of the network traffic analysis device 110 are described below in detail with reference to FIGS. 2 through 6.

Network 108 is a collection of network devices that communicate and route network packets from a source computing device to one or more destination computing devices, and may embodied as, among others, Local Area Networks (LANs), Wide Area Networks (WANs), Wireless Local Area Networks (WLANs), Metropolitan Area Networks (MANs), Campus Area Networks (CANs), Storage Area Networks (SANs), Virtual Private Networks (VPNs), Intranets, Extranets, the Internet, Peer-to-Peer Networks, Mobile Networks and a combination thereof. These networks may be implemented using one or more communication technologies such as Ethernet, Universal Serial Bus (USB), Wi-Fi, Bluetooth, Zigbee, Z-Wave, Global System for Mobile Communications (GSM), Code Division Multiple Access (CDMA), Long-Term Evolution (LTE), Second Generation (2G), Third Generation (3G), Fourth Generation (4G), Fifth Generation (5G), and Sixth Generation (6G).

Architecture of Traffic Analysis Device

Figure 2:
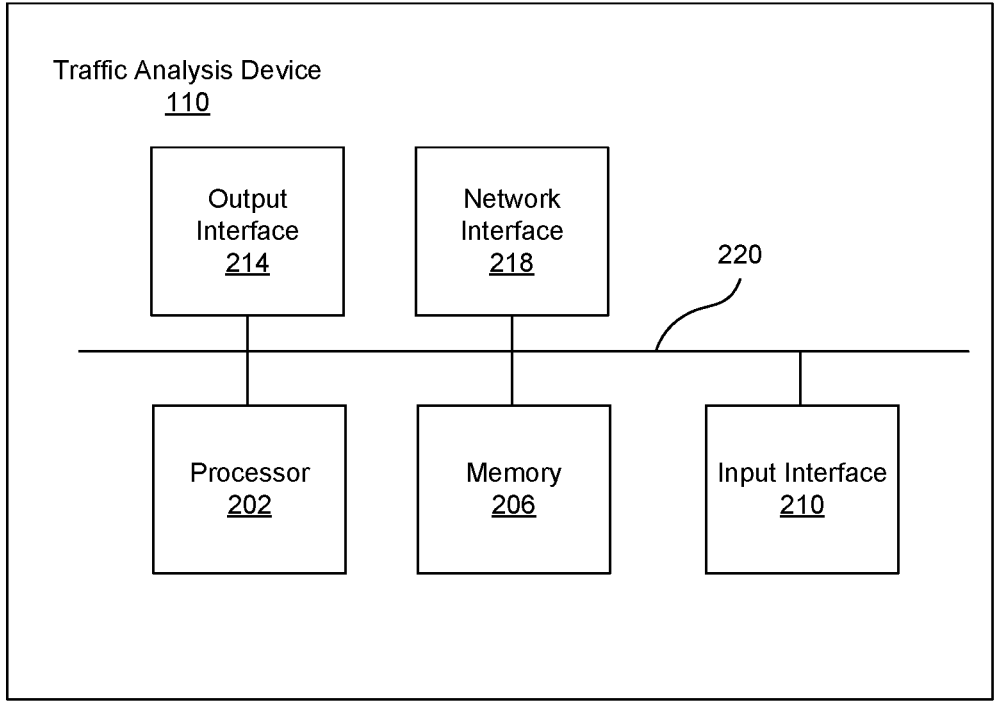
FIG. 2 is a block diagram of a traffic analysis device, according to one embodiment.

FIG. 2 is a block diagram of network traffic analysis device 110, according to an embodiment. The network traffic analysis device 110 may include, among other components, a processor 202, a memory 206, an input interface 210, an output interface 214, a network interface 218, and a bus 220 connecting these components. Network traffic analysis device 110 may include components such as power supply, not illustrated in FIG. 2.

Processor 202 retrieves and executes commands stored in memory 206. Processor 202 may be embodied as a central processing unit (CPU), a graphics processing unit (GPU) or application-specific integrated circuits (ASICs). Although only a single processor 202 is illustrated in FIG. 2, multiple processors may be provided in network traffic analysis device 110.

Memory 206 stores software components including machine learning models and inference module 332 using such models. Memory 206 may be embodied using various technologies or their combinations, including, for example, Random Access Memory (RAM), Read-Only Memory (ROM), flash memory, Hard Disk Drive (HDD), Solid-State Drive (SSD), virtual memory, magnetic tape and optical discs. Various software components stored in memory 206 are described below in detail with reference to FIG. 3 through FIG. 6.

Input interface 210 is hardware or hardware in combination with software that receives data from external sources. The external source may include user interface devices such as a pointing device and keyboard.

Output interface 214 is hardware or hardware in combination with software that provides the result of computation in various forms (e.g., image or audio signals). Output interface 214 may include, for example, a display device. The result of analyzing the network packets and/or prediction results obtained using the machine learning models may be formulated into tables, graphs or texts, and presented to a human operator for further actions. Output interface 214 may also provide graphical user interface (GUI) for receiving user inputs on operations associated with the operation of network traffic analysis device 110.

Network interface 218 enables network traffic analysis device 110 to receive network packets for analysis and/or communicate with computing devices via network 108. Network interface 218 may be embodied as network interface card (NIC) or a network adaptor, and implements various network protocols and standards.

Figure 3:
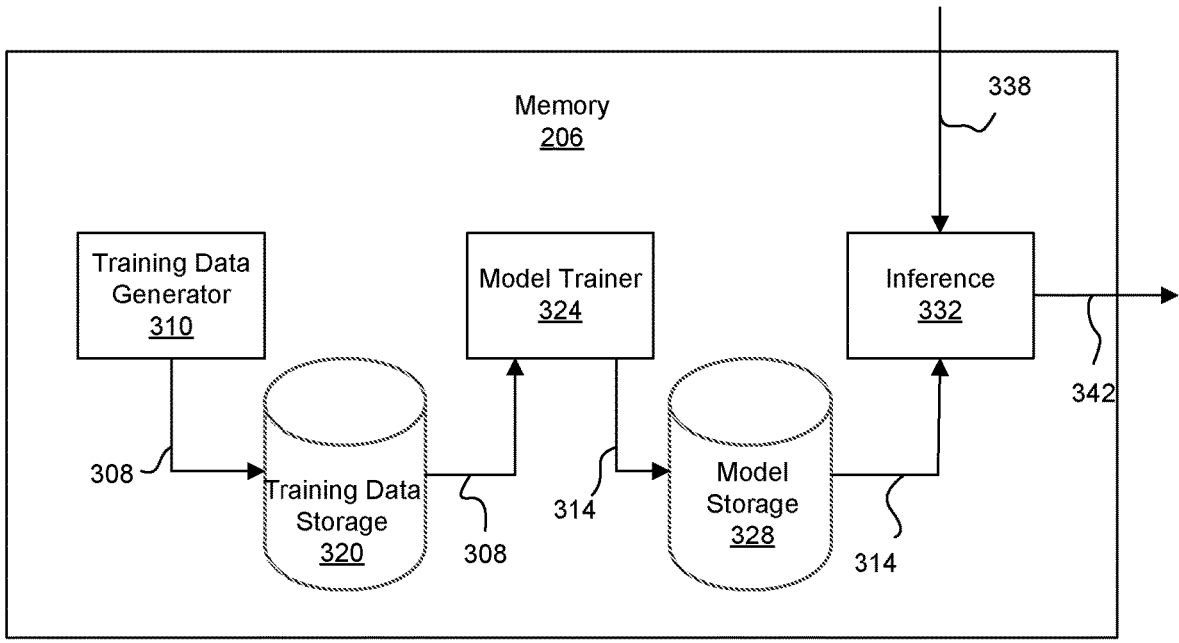
FIG. 3 is a block diagram of software components in memory of the traffic analysis device, according to one embodiment.

FIG. 3 is a block diagram of software components in memory 206 of network traffic analysis device 110, according to one embodiment. Memory 206 may store, among other software components, training data generator 310, training data storage 320, model trainer module 324, model storage 328 and inference module 332. Memory 206 may store further software components (e.g., operation system) or combine multiple software components into a single module.

Training data generator 310 is a software component that generates training data 308 for training machine learning models to perform, for example, analysis on a network, prediction of network failure/success, infer root cause of the failure and/or infer types of success. The details of training data generator 310 are described below in detail with reference to FIG. 4A.

Training data storage 320 stores training data 308 generated by training data generator 310. Training data 308 stored in training data storage 320 may be provided to model trainer module 324. Training data storage 320 may be embodied as a database. In one or more embodiments, training data 308 may be processed further before being provided to model trainer module 324.

Model trainer module 324 is a software component for training one or more machine learning models. When hierarchical machine learning models are used, multiple machine learning models may be trained using different subsets of training data 308 and/or features. The details of model trainer module 324 are described below in detail with reference to FIG. 4B.

Model storage 328 receives trained machine learning models 314 generated by model trainer module 324 and stores them. A plurality of trained machine learning models may be stored in the model storage 328 for access by inference module 332. In one or more embodiments, model storage 328 may receive updated trained machine learning models 314 that enable more accurate prediction and may provide them to inference module 332.

Inference module 332 is a software component that performs inference or prediction using trained machine learning models 314. For this purpose, inference module 332 may receive trained machine learning models 314 from model storage 328. Inference module 332 also receives network packets 338 from network interface 218. After performing inference or prediction using trained machine learning models 314, inference module 332 generates inference result 342. Inference result 342 may predict success/failure of one or more communication flows, predict the type of success (if a communication flow is successful), or predict the root cause of failure (if a communication flow is unsuccessful).

The details of inference module 332 are described below in detail with reference to FIG. 4B.

In one or more embodiments, inference result 342 may be formulated into a graphical user interface (GUI) for presentation to a human operator. Alternatively or in addition, inference result 342 may be sent to another computing device to take remedial actions to resolve the root cause. Presentation in the GUI enables the human operators to gain insights into network traffic patterns, visualize communication flows and identify anomalies in a more intuitive manner.

Example Components of Training Data Generator

Figure 4A:
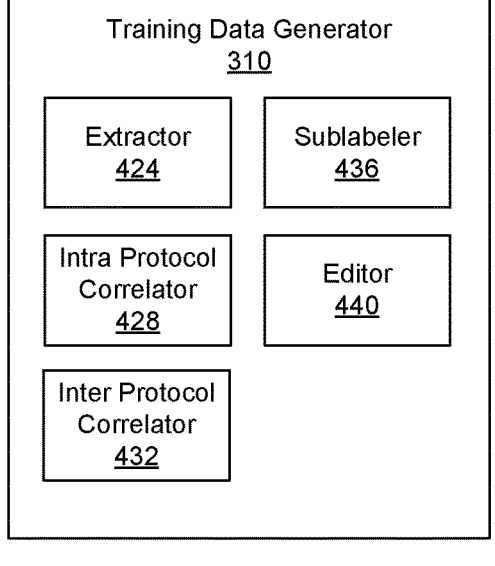
FIG. 4A is a block diagram of a training data generator according to one embodiment.

FIG. 4A is a block diagram of training data generator 310 according to one embodiment. Training data generator 310 may include, among other components, extractor 424, intra protocol correlator 428, inter protocol correlator 432, a sublabeler 436, and an editor 440. Training data generator 310 may include components other that what are illustrated in FIG. 4A. Further, two or more components of training data generator 310 may be combined into a single module.

Extractor 424 is a software component that identifies and extracts relevant network packets for further processing. In one or more embodiments, the network packets may be provided in the form of PCAP files. Extractor 424 may focus on certain protocols used in a service of interests such as Session Initiation Protocol (SIP), Packet Forwarding Control Protocol (PFCP), GPRS Tunneling Protocol version 2 (GTPV2) and S1 Application Protocol (S1AP). By filtering out unnecessary network packets, extractor 424 ensures that training or prediction/inference is focused on information related to protocols of interest.

Intra protocol correlator 428 is a software component that correlates network packets associated with each procedure within a protocol. For example, intra protocol correlator 428 identifies and links request messages with corresponding responses and other messages related to the same transaction. In one or more embodiments, the correlation within the protocol may be performed within the context of a particular protocol and subscribers. In one or more embodiments, the correlated network packets may be identified with an identifier shared across the correlated network packets.

Inter protocol correlator 432 is a software component that correlates network packets associated with the same service for the same subscriber. A service may be associated with multiple transactions and/or communication flows. In one or more embodiments, inter protocol correlator 432 constructs a communication flow that may include network packets associated with different protocols in a coherent way. In doing so, inter protocol correlator 432 may use the identifiers assigned by intra protocol correlator 428. The network packets in the same communication flow may be assigned with a same identifier that are shared by these network packets.

Sublabeler 436 is a software component that analyzes a subtask (e.g., step or procedure) in the communication flow to provide a summary of success or failures of the subtask. Specifically, sublabeler 436 may identify information associated with a successful operation of a subtask, cause codes and error descriptions for a subtask, and tag correlated network packets with labels indicating for example, the successful performance of the subtask, failure of the subtask, the cause codes and error description associated with the failure The labels and/or information on the correlate network packets may be provided to editor 440.

Editor 440 is a software component that adds one or more labels to an entire communication flow to generate training data 308. The labels may be added automatically by a assisted labeling tool which group flows with the same pattern/behavior to give them all the same label. In some embodiments, the adding of labels may be performed manually or by a combination of automatic and manual operations. Further, editor 440 may remove some or all labels tagged by sublabeler 436. The output from editor 440 is training data 308 including correlated network packets and their labels.

Components of Model Trainer Module

Figure 4B:
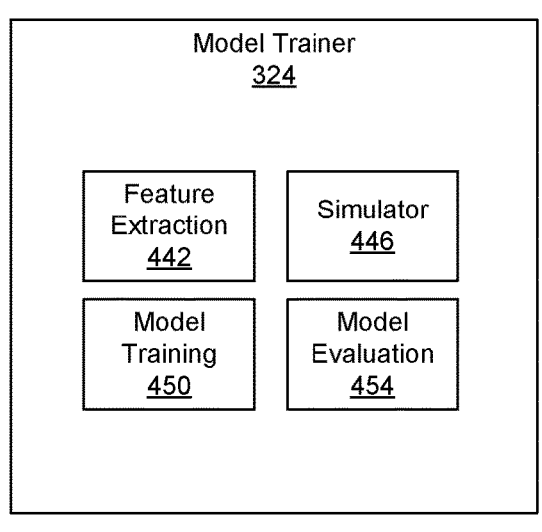
FIG. 4B is a block diagram of a model trainer module according to one embodiment.

FIG. 4B is a block diagram of model trainer module 324 according to one embodiment. Model trainer module 324 may include, among other components, a feature extraction module 442, a simulator 446, a model training module 450 and a model evaluation module 454. Model trainer module 324 may include further components not illustrated in FIG. 4B or combine two or more components in FIG. 4B into a single module.

Feature extraction module 442 is software that generates features from training data 308. Feature extraction module 442 identifies specific events such as video calls, diversion and call conferences, and dynamically extracts information associated with the specific events from the communication flow. The extracted information may not be in a format suitable for training machine learning models. Hence, feature extraction module 442 may convert such extracted information into a format that is suitable for training the machine learning models. In one or more embodiments, feature extraction module 442 converts the extracted information into rows where each row is associated with a communication flow and includes a piece of the extracted information and a label. When multiple machine learning models are used to hierarchically process information derived from the network packets, each of the machine learning models may be trained using different pieces of information (e.g., different features), as described below in detail with reference to model training module 450.

Simulator 446 is software that generates information representing variations to root causes of failure or types of successes in communication flows. Training data 308 gathered from real PCAP files or real network packets may not include sufficient variations in information for training the machine learning models. Hence, simulator 446 synthesizes features, network packets and/or other information by simulating operations on the network under various circumstances that are infrequently or rarely encountered. The synthesized features, network packets or other information may be used by model training module 450. Alternatively, synthesized network packets and their related information may be provided to training data generator 310 for preprocessing followed by training by model trainer module 324. In this way, more complete training data or information may be obtained where synthetic data derived from simulator 446 supplants real network packets or information. In one or more embodiments, training data 308 derived from real network packets and synthesized network packets include communication flows and corresponding labels.

Model training module 450 is software that generates machine learning models and performs training of the machine learning models. During the training of a machine learning model, model training module 450 sets up initial or default parameters or coefficients of the machine learning model, and provides the features to perform inference or prediction. The features may include labels on success/ failure of communication flow, root causes of failure, and types of success). The result of inference or prediction is then compared with the correct result. In some embodiments, if there are any differences between the result generated by the machine learning model and the correct result, these differences are backpropagated to update the parameters or coefficients of the machine learning models to reduce the differences. The machine learning models may be trained by feeding different features and backpropagating the result of inference or prediction.

Model training module 450 may generate multiple machine learning models with a hierarchical structure. For example, a two-stage hierarchical model structure may be used where the first stage predicts or infers whether a communication flow includes a failure or not, and the second stage predicts of infers more detailed circumstances on the failure or success. For these purposes, binary classifiers may be used as the machine learning models at each stage. The machine learning models may be trained using the different algorithms and/or parameters and then stored in model storage 328 for selection and deployment. In addition to predicting or inferencing whether the communication flow is a failure or success, the machine learning model at the first stage may also output a score that represents the probability that its prediction or inference is correct. During inference, a default threshold for determining if a given communication flow is a failure or a success may be set to a certain value (e.g., 0.5), and then a Receiver Operating Characteristic (ROC) curve may be used to identify the preferred threshold. The use of using the threshold enables the machine learning model output one of the following: "failure," "success" or "unknown." In some embodiments, the score generated by the machine learning model at the first stage may be provided to the one or more machine learning models at the second stage as part of the features used for performing performance or inference at the second stage.

The one or more machine learning models at the second stage may be trained to provide more detailed information on the communication flow. For example, machine learning models at the second stage may predict or infer a root error if the communication flow is predicted or inferred to include a failure or not by the machine learning model at the first stage. As in training the machine learning model at the first stage, the machine learning models at the second stage may be embodied as binary classifiers assigned with thresholds for their classification operations. In one or more embodiments, a first group of machine learning models at the second stage is used when the prediction or inference at the first stage indicates that a communication flow includes a failure whereas a second group of machine leaning models at the second stage is used when the prediction or inference at the first stage indicates that a communication flow does not include a failure and the communication flow is a success.

In one embodiment, separate features are generated for training the machine learning models in the second stage. All features generated by feature extraction module 442 may be used for training the machine learning model in the first stage. Feature extraction module 442 or model training module 450 may generate the same or separate features from the features generated by feature extraction module 442 for training the machine learning models in the second stage. The separate features may be generated by filtering or selecting a subset of features generated by feature extraction module 442. The features generated by feature extraction module 442 irrelevant to a machine learning model in the second stage may be filtered out. For example, if a machine learning model at the second stage is to be trained to predict or infer a specific type of failure, features associated with successful communication flows may be filtered out to generate the features for training the machine learning model. Conversely, if a machine learning model at the second stage is to be trained to predict or infer a specific type of success, features associated with failed communication flows may be filtered out to generate the features for training the machine learning model. Such filtering may be performed by setting up filtering criteria manually. Further, in addition to the features generated by feature extraction module 442, the features provided to the machine learning models at the second stage may include scores indicating confidence of the prediction or inference made by the machine learning model as the first stage.

The machine learning models may be embodied using various algorithms. Example machine learning models that may be trained by model training module 450 may include, among others, logistic regression, support vector machine (SVM), decision trees, random forests, neural network, or gradient boosting algorithm. Further, an ensemble of different machine learning models may be used to embody one or more binary classifier.

Model evaluation module 454 is software for determining performance of machine learning models and selecting ones with better performance for deployment in inference module 332. A large number of machine learning models of the first stage and the second stage may be trained using different architecture and/or parameters. After these machine learning models are trained, model evaluation module 454 assesses their performance. In one or more embodiments, performance scores may be assigned to each of the machine learning models. Model evaluation module 454 may select a subset of machine learning models with higher performance scores and deployed them in inference module 332.

Example Components of Inference Module

Figure 5:
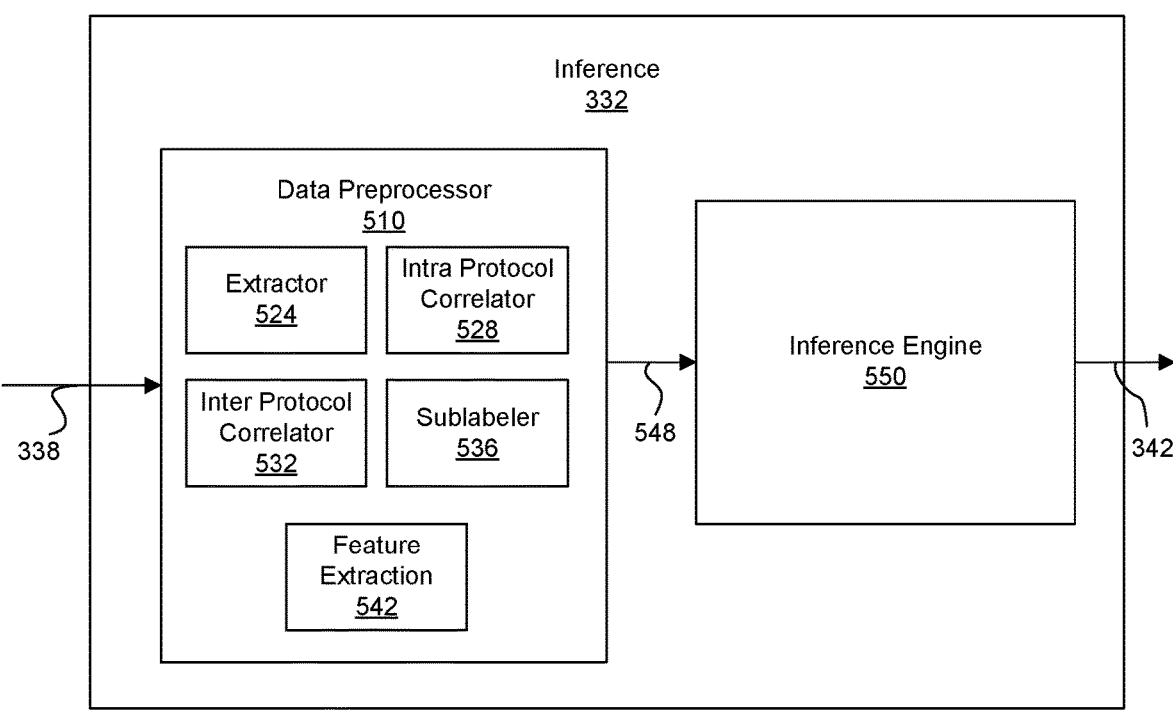
FIG. 5 is a block diagram of an inference module, according to one embodiment.

FIG. 5 is a block diagram of inference module 332, according to one embodiment. Inference module 332 may include, among other components, data preprocessor 510 and inference engine 550. Inference module 332 may include components not illustrated in FIG. 5.

Data preprocessor 510 processes network packets 338 into features 548 for providing to inference engine 550. Data preprocessor 510 may include, among other components, extractor 524, intra protocol correlator 528, inter protocol correlator 532, sublabeler 536 and feature extractor 542 that are substantially the same as extractor 424, intra protocol correlator 428, inter protocol correlator 432, sublabeler 436, and feature extraction module 442, respectively, except that network packets 338 of communication flows for analysis are used instead of training data 308. Hence, the details of the functions of these components in data preprocessor 510 are omitted herein for the sake of brevity. By automating various aspects of network packet analysis (e.g., extraction, correlation, and labeling), inference module 332 enables the network packet analysis process to be streamlined and reduces time and resources spent by human operators to maintain or troubleshoot a network.

Figure 6:
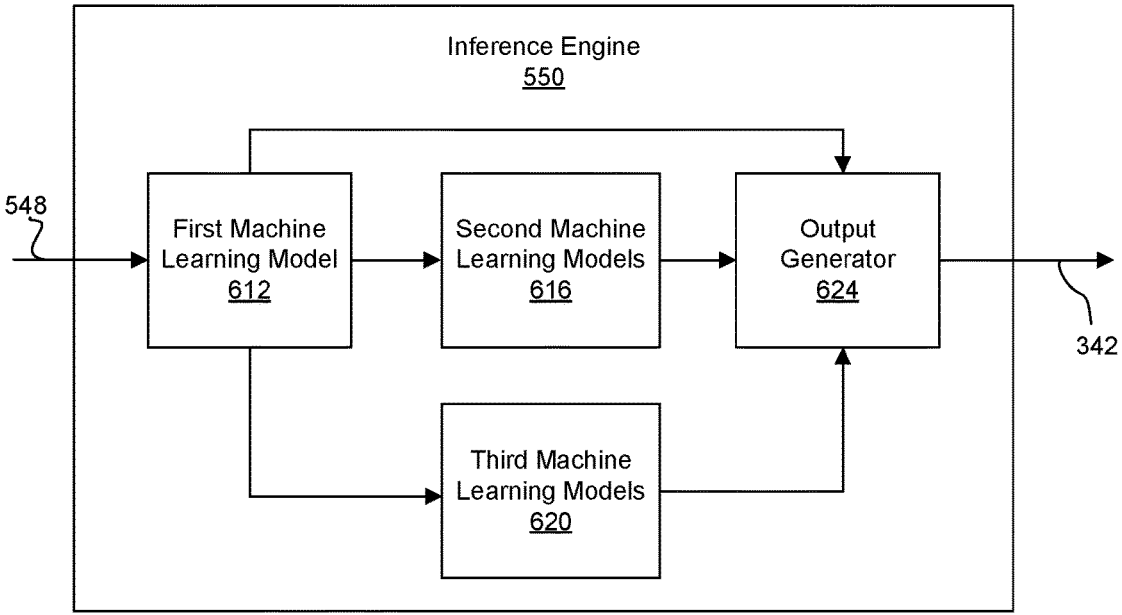
FIG. 6 is a block diagram of an inference engine in the inference module, according to one embodiment.

Inference engine 550 is software for initiating and executing machine learning models selected by model evaluation module 454. Inference engine 550 is deployed with selected machine learning models. Using the deployed machine learning models, inference engine 550 processes features 548 received from data preprocessor 510. FIG. 6 is a block diagram of inference engine 550, according to one embodiment. Inference engine 550 stores and executes first machine learning model 612 at a first stage, second machine learning models 616 and third machine learning models 620. Second machine learning models 616 and third machine learning models 620 are at the second stage. The prediction or inference results from these machine learning models 612, 616, 620 are collected by output generator 624 to generate inference result 342.

First machine learning model 612 is at the first stage of the hierarchy and generates a prediction or inference indicating whether a communication flow includes a failure. In one or more embodiments, first machine learning model 612 generates a result separating the communication flows corresponding to features 548 into three distinct categories: success, failure, and unknown. First machine learning model 612 is assigned with a threshold on likely accuracy of the prediction or inference. Any prediction or inference result produced by first machine learning model 612 with a score within a certain range of the threshold is determined as "unknown" whereas the score at, above or beyond the range are determined as success or failure. The results indicating "unknown" may be provided to training data generator 310 and/or model trainer module 324 to generate improved machine learning models.

Second machine learning models 616 and third machine learning models 610 are at the second stage of the hierarchy. Second machine learning models 616 may be used when the communication flow is predicted or inferred to include a failure by first machine learning model 612. Second machine learning models 616 may process features 548 or a subset thereof and other information (e.g., result of inference from first machine learning model 612) to generate an inference result indicating likely root causes of the failure and their probabilities.

In one or more embodiments, one versus all (also known as "one versus the rest") technique may be used in machine learning models of the second stage of the hierarchy. For example, each of the second machine learning models 616 may be embodied as a binary classifier with an assigned threshold to identify whether the failure is associated with one specific type of root cause or other root causes. Similarly, third machine learning models 620 may be used when the communication flow is predicted or inferred not to include a failure. Like second machine learning models 616, each of third machine learning models 620 may process features 548 or a subset thereof and other information (e.g., result of inference from first machine learning model 612) to generate an inference result indicating whether the success is one specific type of success or a type of success other than the specific type. For example, some types of success may accompany certain warnings (e.g., no bye message) while other types of success does not accompany any warnings. As in first machine learning model 612, each of the second and third machine learning models 616, 620 may be assigned with a threshold. Any inference or prediction result producing a score within a range of the threshold is determined as unknown whereas the score at, above or below the range is determined as indicative of a specific type of success/root cause or not.

As in training the machine learning models, different versions or selections of features are used for feeding to different machine learning models. The machine learning model at a lower hierarchy may be provided with all features generated by extractor 524. Conversely, machine learning models at a higher hierarchy may be provided with different versions or a subset of features generated by extractor 524. For example, a subset of features relevant to identifying a certain error or cause of a failure in a communication flow may be selected and provided to a machine learning model in the higher hierarchy to infer or predict the error or the cause of a failure while filtering out any irrelevant features including features related to a successful communication flow. Conversely, a subset of features relevant to identifying a type of success in a communication flow may be selected and provided to a machine learning model in the higher hierarchy to infer or predict the type of success while filtering out any irrelevant features including features related to a failed communication flow. Further, the features provided to the machine learning models at the higher hierarchy may include information generated by the machine learning models at the lower hierarchy (e.g., scores).

Although the above embodiments of model training module 450 and inference engine 550 are described as using binary classifiers, multiclass classifiers may be used as the machine learning models. Further, Naive Bayes, Logistic Regression, K-Nearest Neighbors, Support Vector Machine, Decision Tree, Bagging Decision Tree, Boosted Decision Tree, Random Forest, Voting Classification, Neural Network and all types of combinations using stacking or transfer learning technics may also be used as machine learning models.

Example Process of Analyzing Network Packets

Figure 7:
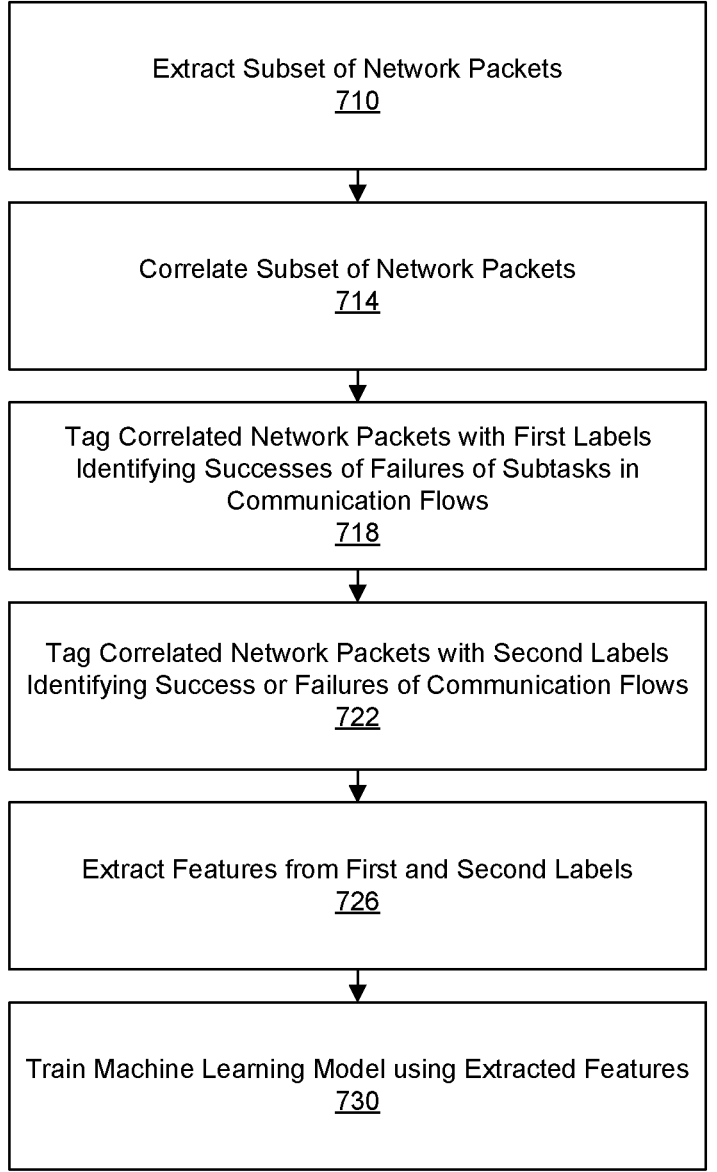
FIG. 7 is a flowchart illustrating a process for training a machine learning model to analyze network packets, according to one embodiment.

FIG. 7 is a flowchart illustrating a process for training a machine learning model to analyze network packets, according to one embodiment. A subset of network packets is extracted 710 from network packets received from a network.

The network packets are correlated 714. Such correlation includes correlating some of the network packets associated with the same procedure within the same protocol, and correlating certain network packets related to the same service across a plurality of different protocols and interfaces.

The correlated network packets are tagged 718 with first labels that identify successes or failures in subtasks of communication flows associated with the correlated network packets. Subtasks are part of a communication flow, and each of these first labels may indicate whether each of the subtasks was a success or a failure. The first labels may be tagged to the correlated network packets by sublabeler 436.

The correlated network packets are also tagged 722 with second labels that indicate whether the entire communication flows was a success or failure. Each of the second labels indicate whether an entire communication flow (including multiple subtasks) was a success or a failure. Hence, the second labels identify success or failure at a higher granular level compared to the first labels. The second labels may be tagged to the correlated network packets by editor 440.

Features are then extracted 726 from the first and second labels and the correlated network packets by feature extraction module 442. The extracted features may be converted into a format appropriate for training a machine learning model. In some embodiments, simulation may be performed to synthesize features, network packets and/or other information for training the machine learning model. Such synthesized features t may address various circumstances that are infrequently or rarely encountered in real network operations.

The extracted features are applied to the machine learning model to train 730 the machine learning model. In one or more embodiments, a subset of features may be generated from the extracted features to perform training on one or more machine learning models at a higher hierarchy. Such machine learning models at the higher hierarchy may be trained to provide finer granular information or detailed information such as cause, error or type of success or failure of the communication flows.

In one or more embodiments, one or more machine learning models may generate prediction or inference indicating that it is uncertain whether a success or a failure is likely. For example, these machine learning models may generate an "unknown" prediction that indicates that neither a success or a failure is likely. Such "unknown" prediction may be fed back to the one or more machine learning models for further training to improve their prediction.

The processes and their sequences as described above with reference to FIG. 7 are merely illustrative. The processes for training the machine learning model may include additional processes such as performing preprocessing on the network packets. Further, some processes may be performed in parallel or in a different sequence. For example, the tagging 718 of the first labels and the tagging 722 of the second labels may be performed in parallel or in an order reverse to what is illustrated in FIG. 7.

Figure 8:
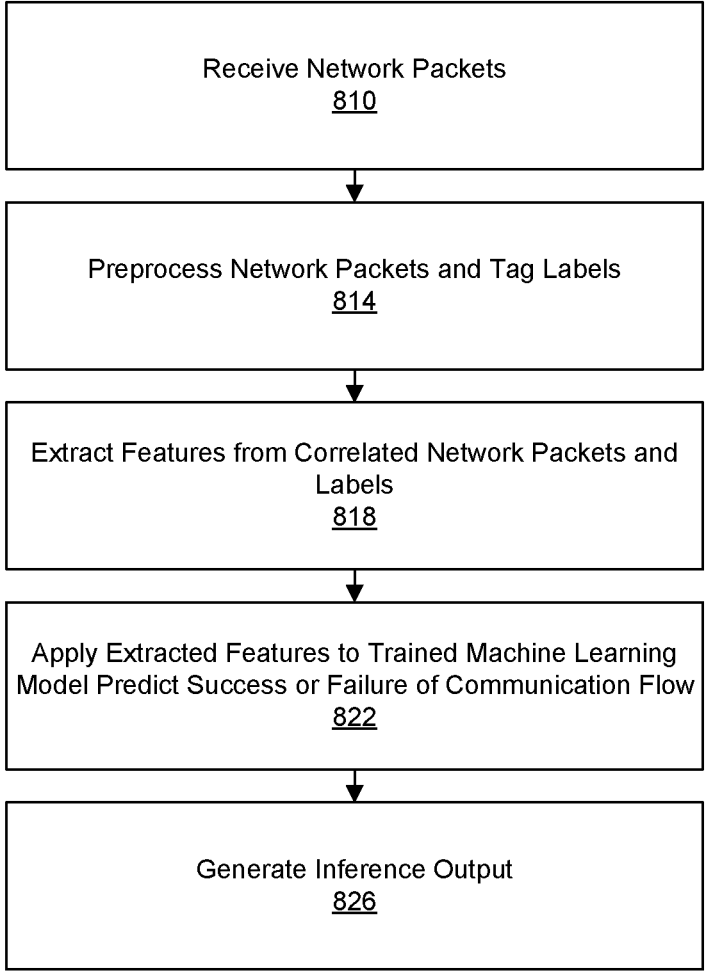
FIG. 8 is a flowchart illustrating a process for performing network packet analysis, according to one embodiment.

FIG. 8 is a flowchart illustrating a process for performing network packet analysis, according to one embodiment. Network packets may be received 810 from a location in a network. These network packets may be associated with a plurality of communication flows.

The received network packets are then preprocessed 814. The preprocessing includes filtering the networks to extract a subset of network packets that are of interest. The extracted network packets may be correlated and then tagged with labels that identify successes or failures in a subtask of a communication flow associated with the correlated network packets.

The correlated network packets and their labels are then further processed to extract 818 first features. The network packets and their labels may also be converted into a format suitable for processing by a machine learning model.

The extracted features are applied 822 to a trained machine learning model (for example, trained according to the processes as described above with reference to FIG. 7) to predict a success or a failure of the communication flow associated with the correlated network packets. As a result, the trained machine learning model generates 826 an inference output that may indicate, among others, prediction or inference on the success or the failure of the communication flows.

The extracted features may also be processed to generate different versions or subsets of features. Each of these different versions or subsets of features may be provided to different machine learning models at a higher hierarchy to make more detailed prediction such as the types of success, the types of error or root cause of the error.

The processes and their sequences as described above with reference to FIG. 8 are merely illustrative. The process for training the machine learning model may include additional processes such as performing preprocessing at additional machine learning models at a higher hierarchy. Further, some processes may be performed in parallel or in a different sequence. For example, processing 814 of the network packets and extracting 818 of the features may be performed in parallel or in an order reverse to what is illustrated in FIG. 8.

Alternative or Additional Embodiments

In one or more embodiments, PCAP files are generated continuously with the operation of the network. The PCAP files are then processed by network traffic analysis device 110 in a pipelined manner to continuously monitor and analyze network traffic. In this way, network issues may be detected in real-time or near real-time so that prompt remedial actions may be taken. Such continuous monitoring enables human operators to proactively address potential failures or performance degradation, reducing service disruptions and increasing the network uptime.

Although only a single network traffic analysis device is described in the above embodiments, multiple network traffic analysis devices may be deployed and perform the network analysis operations. The results or prediction from each of the network traffic analysis devices may be shared among the network traffic analysis device to make better diagnosis of the network issues and take more appropriate remedial actions. In such embodiments, each of the network traffic analysis device may perform analysis on a subset of users, services or network components.

Upon reading this disclosure, those of skill in the art will appreciate still additional alternative designs for processing nodes. Thus, while particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A method for analyzing network packets, comprising:
   receiving the network packets from a location in a network;
   preprocessing the received network packets to extract a subset of the network packets, correlate network packets in the subset of the network packets, and tag the correlated network packets with labels that identify one or more successes or failures in one or more subtasks of a communication flow associated with the correlated network packets;
   applying the first features to a first machine learning model to predict or infer a success or a failure of the communication flow associated with the correlated network packets; and
   generating an inference output based on the prediction or inference.

2. The method of claim 1, further comprising:
   generating second features from the first features; and
   responsive to predicting or inferring the failure of the communication flow by the first machine learning model, applying the second features to a second machine learning model to predict or infer a cause of the failure, the inference output based further on the predicted or inferred cause.

3. The method of claim 2, further comprising:
   generating third features from the first features; and
   responsive to predicting or inferring the success of the communication flow by the first machine learning model, applying the third features to a third machine learning model to predict or infer a type of success of the communication flow, the inference output based further on the type of success.

4. The method of claim 3, wherein the second features are a subset of the first features, and the third features are another subset of the first features.

5. The method of claim 2, wherein the first machine learning model generates a first score and the second machine learning model generates a second score, the first score and the second score associated with different thresholds for classifying the prediction or inference.

6. The method of claim 1, wherein the network packets are correlated by:
   correlating first network packets associated with a same procedure within a same protocol; and
   correlating second network packets related to a same service across a plurality of different protocols.

7. The method of claim 1, wherein the first machine model is trained using synthetic training data generated by a simulator simulating operations on the network.

8. The method of claim 1, wherein the first machine learning model is configured to output a score indicating one of: the success of the communication flow, the failure of the communication flow, and unknown status as to whether the communication flow was successful or failed.

9. A method of training machine learning models for performing network packet analysis, comprising:
   extracting a subset of network packets from network packets received from a network;
   correlating network packets in the subset of the network packets;
   tagging the correlated network packets with first labels that identify one or more successes or failures in one or more subtasks of communication flows associated with the correlated network packets;
   tagging the correlated network packets with second labels that identify successes or failures of the communication flows associated with the correlated network packets;
   extracting first features from at least one of the first labels or the second labels; and
   training a first machine learning model using the extracted first features to predict or infer successes or failures of subsequent communication flows.

10. The method of claim 9, further comprising:
    generating second features from the first features; and
    training a second machine learning model using the second features to predict or infer causes of the failure of the communication flows.

11. The method of claim 10, further comprising:
    generating third features from the first features; and
    training a third machine learning model using the third features to predict or infer types of successes of the communication flows.

12. The method of claim 11, wherein the second features are a subset of the first features, and the third features are another subset of the first features.

13. The method of claim 10, wherein the first machine learning model generates a first score and the second machine learning model generates a second score, the first score and the second score associated with different thresholds for classifying the prediction or the inference.

14. The method of claim 9, wherein correlating the network packets comprises:
    correlating first network packets associated with a same procedure within a same protocol; and
    correlating second network packets related to a same service across a plurality of different protocols.

15. The method of claim 9, further comprising:
    synthesizing additional features by simulating operations on the network; and
    training the first machine learning model using the additional features.

16. The method of claim 1, wherein the first machine learning model is trained to output a score indicating one of: the success of the communication flow, the failure of the communication flow, and unknown status as to whether the communication flow was successful or failed.

17. A network traffic analysis device, comprising:

a processor; and memory storing instructions thereon, the instructions when executed by a processor cause the processor to:

receive network packets from a location in a network, preprocess the received network packets to extract a subset of the network packets, correlate network packets in the subset of the network packets, and tag the correlated network packets with labels that identify one or more successes or failures in one or more subtasks of a communication flow associated with the correlated network packets, extract first features from the correlated network packets and the labels, apply the first features to a first machine learning model to predict or infer a success or a failure of the communication flow associated with the correlated network packets, and generate an inference output based on the prediction or inference.

18. The network traffic analysis device of claim 17, wherein the memory further stores instructions that cause the processor to:

generate second features from the first features; and responsive to predicting or inferring the failure of the communication flow by the first machine learning model, apply the second features to a second machine learning model to predict or infer a cause of the failure, the inference output based further on the predicted or inferred cause.

19. The network traffic analysis device of claim 18, wherein the memory further stores instructions that cause the processor to:

generate third features from the first features; and responsive to predicting or inferring the success of the communication flow by the first machine learning model, apply the third features to a third machine learning model to predict or infer a type of success of the communication flow, the inference output based further on the type of success.

20. The network traffic analysis device of claim 19, wherein the second features are a subset of the first features, and the third features are another subset of the first features.

* * * * *